United States Patent
Eggermont

(10) Patent No.: US 10,028,343 B2
(45) Date of Patent: Jul. 17, 2018

(54) AVERAGE CURRENT AND FREQUENCY CONTROL

(71) Applicant: SEMICONDUCTOR COMPONENTS INDUSTRIES, LLC, Phoenix, AZ (US)

(72) Inventor: Jean-Paul Eggermont, Pellaines (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/824,368

(22) Filed: Nov. 28, 2017

(65) Prior Publication Data

US 2018/0116019 A1    Apr. 26, 2018

Related U.S. Application Data

(63) Continuation of application No. 15/378,517, filed on Dec. 14, 2016, now Pat. No. 9,900,942.
(Continued)

(51) Int. Cl.
*H05B 33/08* (2006.01)
*H02M 1/088* (2006.01)
(Continued)

(52) U.S. Cl.
CPC ........ *H05B 33/0815* (2013.01); *H02M 1/088* (2013.01); *H02M 3/158* (2013.01); *H02M 2001/0009* (2013.01)

(58) Field of Classification Search
CPC .............. H05B 33/0815; H05B 33/089; H05B 33/0866; H05B 33/0818; H05B 37/02;
(Continued)

(56) References Cited

U.S. PATENT DOCUMENTS 6,885,568 B2    4/2005  Kernahan et al.
7,009,370 B2    3/2006  Deaton
(Continued)

OTHER PUBLICATIONS

Allegro MicroSystems LLC, "Automotive High Current LED Controller," A6268 Data Sheet, Rev. 3, [retrieved on Dec. 5, 2016]. Retrieved from the Internet. <URL: http://www.allegromicro.com/en/Products/Regulators-And-Lighting/LED-Drivers-For-Lighting/A6268.aspx>.
(Continued)

*Primary Examiner* — Haissa Philogene
(74) *Attorney, Agent, or Firm* — Wash Park IP Ltd.; John T. Kennedy

(57) ABSTRACT

Apparatuses, systems and methods for regulating the output currents of a power supply at a target output current include a buck converter module operably connected to a power source and a load. A first switch couples the power source to the buck converter module during a first period of a given operating cycle, while the buck converter module stores and provides electrical power to the load. During a second period, a second switch may discharge, the electrical power stored during the first period. A current sensor senses the currents during at least one of the first period and the second period and, over the operating cycle, the switching times are adjusted so the average output current equals the target output current. Adjustments to the first and second period durations result in maximum and a minimum currents symmetrically disposed about the average current provided to the load during the operating cycle.

20 Claims, 6 Drawing Sheets

Related U.S. Application Data

(60) Provisional application No. 62/410,937, filed on Oct. 21, 2016.

(51) Int. Cl.
 H02M 3/158 (2006.01)
 H02M 1/00 (2006.01)

(58) Field of Classification Search
 CPC ...... H02M 3/156; H02M 3/158; H02M 1/088; H02M 2001/0009
 See application file for complete search history.

(56) References Cited

U.S. PATENT DOCUMENTS

| | | | |
|---|---|---|---|
| 7,280,375 | B2 | 10/2007 | Joos |
| 7,511,437 | B2 | 3/2009 | Lys et al. |
| 7,888,881 | B2 | 2/2011 | Shteynberg et al. |
| 7,888,890 | B2 | 2/2011 | Joos et al. |
| 8,193,795 | B2 | 6/2012 | Zhou et al. |
| 8,461,502 | B2 | 6/2013 | Gianordoli et al. |
| 8,994,347 | B2 | 3/2015 | Galbis et al. |
| 9,161,411 | B1 | 10/2015 | Dunn et al. |
| 9,247,608 | B2 | 1/2016 | Chitta et al. |
| 9,270,122 | B2 | 2/2016 | Stoger |
| 9,814,115 | B2 * | 11/2017 | Kido ............... H05B 33/089 |
| 9,887,614 | B1 * | 2/2018 | Horsky ............. H02M 1/08 |
| 9,900,942 | B1 * | 2/2018 | Eggermont ...... H05B 33/0815 |
| 2013/0038210 | A1 | 2/2013 | Stoger |
| 2015/0367777 | A1 | 12/2015 | Dunn et al. |

OTHER PUBLICATIONS

ON Semiconductor, "350 mA High Efficiency Step Down LED Driver," CAT4201/D Data Sheet, Sep. 2015, Rev. 9, [retrieved on Dec. 5, 2016]. Retrieved from the Internet: <URL: http://www.onsemi.com/PowerSolutions/extSearch.do?query=cat4201d&param1=type&param1_val=document>.

NXP, "ASL3416SHN: Three-channel Automotive LED Buck Driver," [retrieved on Dec. 8, 2016]. Retrieved from the Internet: <URL: http://www.nxp.com/products/power-management/lighting-driver-and-controller-ics/automotive-lighting-led-driver-ics/three-channel-automotive-led-buck-driver:ASL3416SHN>.

Diodes Incorporated, "ZXLD1350 30V 350mA LED Driver with AEC-Q100," ZXLD1350 Data Sheet, Mar. 2011, Rev. 8-2, [retrieved on Dec. 5, 2016]. Retrieved from the Internet. <URL: http://www.diodes.com/search?type=0&value=ZXLD1350>.

Infineon LITIX Power, "700mA High Integration—DC/DC Step-Down Converter," TLD5045EJ Data Sheet, May 28, 2015, Rev. 1.0, [retrieved on Dec. 9, 2016]. Retrieved from the Internet. <URL: http://www.infineon.com/dgdl/Infineon-TLD5045EJ-DS-v01_00-EN.pdf?fileId=db3a304330f6860601310a21ecb200b1>.

Micrel Inc., "High-Brightness LED Driver Controller with High-Side Current Sense," MAQ3203 Data Sheet, Apr. 20, 2015, Rev. 1.2, [retrieved on Dec. 5, 2016] . Retrieved from the Internet. <URL: http://ww1.microchip.com/downloads/en/DeviceDoc/maq3203.pdf>.

ON Semiconductor, "Up to 1.5 A Constant Current Switching Regulator for LEDs with ON/Off Function," NCP3066, NCV3066 Data Sheet, Jan. 2009, Rev. 3, [retrieved on Dec. 9, 2016]. Retrieved from the Internet. <URL: http://www.onsemi.com/pub_link/Collateral/NCP3066-D.PDF>.

ON Semiconductor, "Buck/Boost/Inverting Regulator, Switching, Constant Current, 1.5 A, for HB-LEDs," NCP3065 Data Sheet, Rev. 3, May 2009, [retrieved on Dec. 5, 2016]. Retrieved from the Internet. <URL: https://www.onsemi.com/PowerSolutions/search.do?query=ncv3065&tabbed=Y&clearFilters=Y&searchType=others>.

ON Semiconductor, "Up to 1.5 A Constant Current Switching Regulator for LEDs," NCP3065, NCV3065 Data Sheet May 2009, Rev. 3, [retrieved on Dec. 5, 2016]. Retrieved from the Internet. <URL: http://www.onsemi.com/pub_link/Collateral/NCP3065.PDF>.

Rohm Semiconductor, "White LED Driver IC for Automotive lamp (Switching regulator type)," BD8381EFV-M Technical Note, Oct. 2010, Rev. 0.11, [retrieved on Dec. 5, 2016]. Retrieved from the Internet. <URL: http://www.rohm.com/web/global/news-detail?news-title=rohm-delivers-industry-s-first-single-chip-led-driver-for-automotive-headlamps-and-running-lights%EF%BC%81&defaultGroupId=false>.

Rohm Semiconductor, "Automotive White LED Driver IC," BD8112EFV-M Technical Note, Sep. 2009, Rev. B, [retrieved on Dec. 5, 2016]. Retrieved from the Internet. <URL: https://media.digikey.com/pdf/Data%20Sheets/Rohm%20PDFs/BD8112EFV-M.pdf>.

Supertex, Inc., "Universal High Brightness LED Drive," HV9910 Data Sheet 2004, [retrieved on Dec. 9, 2016]. Retrieved from the Internet. <URL: http://www.microchip.com/wwwproducts/en/hv9110>.

Texas Instruments, "LM3401 Hysteretic PFET Controller for High Power LED Drive,"LM3401 Data Sheet, Aug. 2007, Rev. May 2013 [retrieved on Dec. 9, 2016]. Retrieved from the Internet. <URL: http://www.ti.com/lit/ds/symlink/m3401.pdf>.

Texas Instruments, "350 mA, Constant Current Output Floating Buck Switching Converter for High Poer LEDs," LM3407 Data Sheet, Jan. 2008, Rev. May 2013, [retrieved on Dec. 9, 2016]. Retrieved from the Internet. <URL: http://www.ti.com/lit/ds/symlink/lm3407.pdf>.

Texas Instruments, "LM3405 1.6MHz, 1A Constant Current Buck Regulator for Powering LEDs," LM3405 Data Sheet, Oct. 2006, Rev. May 2013, [retrieved on Dec. 9, 2016]. Retrieved from the Internet. <URL: http://www.ti.com/lit/ds/symlink/lm3405.pdf>.

Texas Instruments, "LM3406 1.5-A, Constant Current, Buck Regulator for Driving High Power LEDs," LM3406, LM3406HV, LM3406HV-Q1 Data Sheet, Sep. 2008, Rev. Mar. 2014, [retrieved on Dec. 9, 2016]. Retrieved from the Internet. <URL: http://www.ti.com/lit/ds/symlink/lm3406.pdf>.

Texas Instruments, "LM3409, -Q1, LM3409HV, -Q1 P-FET Buck Controller for High-Power LED Drivers," LM3409, LM3409-Q1, LM3409HV, LM3409HV-Q1 Data Sheet, Mar. 2009, Rev. Jun. 2016, [retrieved on Dec. 9, 2016]. Retrieved from the Internet. <URL: http://www.ti.com/lit/ds/symlink/lm3409hv.pdf>.

Texas Instruments, "LM342x/-Q1 N-Channel Controllers for Constant-Current LED Drivers," LM3421, LM3421-Q1, LM3423, LM3423-Q1, Jul. 2008, Rev. Jul. 2015, [retrieved on Dec. 9, 2016]. Retrieved from the Internet. <URL: http://www.ti.com/lit/ds/symlink/lm3423.pdf>.

Texas Instruments, "LM3424/-Q1 Constant Current N-Channel Controller with Thermal Foldback for Driving LEDs," LM3424, LM3424-Q1, Aug. 2009, Rev. Aug. 2015, [retrieved on Dec. 9, 2016]. Retrieved from the Internet. <URL: http://www.ti.com/lit/ds/symlink/lm3424-q1.pdf>.

Texas Instruments, "LM3429/-Q1 N-Channel Controller for Constant Current LED Drivers," LM3429-Q1, Apr. 2009, Rev. Jul. 2015, [retrieved on Dec. 9, 2016]. Retrieved from the Internet. <URL: http://www.ti.com/lit/ds/symlink/lm3429-q1.pdf>.

Vlad Anghel, Christopher Bartholomeusz, Anca Gabriela Vasilica, Gheorghe Pristavu, and Gheorghe Brezeanu, "Variable Off-Time Control Loop for Current-Mode Floating Buck Converters in LED Driving Applications," IEEE Journal of Sold-State Circuits, pp. 1571-1579, vol. 49, No. 7, Jul. 2014, DOI: 10.1109/JSSC.2014.2320456.

Giovanni Capodivacca, Paolo Milanesi and Andrea Scenini, "Integrated Buck LED Driver With Application Specific Digital Architecture," IEEE, pp. 343-346, 2013, DOI: 10.1109/ESSCIRC.2013.6649143.

Zhidong Liu, Hoi Lee, "A 26 W 97%-Efficiency Fast-Settling Dimmable LED Driver With Dual-nMOS-Sensing Based Glitch-Tolerant Synchronous Current Control for High-Brightness Solid-State Lighting Applications," IEEE Journal of Solid-State Circuits, pp. 2174-2187, vol. 50, No. 9, 2015, DOI: 10.1109/JSSC.2015.2424375.

(56) References Cited

OTHER PUBLICATIONS

Chao-Hsuan Liu, Chun-Yu Hsieh, Yu-Chiao Hsieh, Ting-Jung Tai, and Ke-Horng Chen, "SAR-Controlled Adaptive Off-Time Technique Without Sensing Resistor for Achieving High Efficiency and Accuracy LED Lighting System," IEEE Transactions on Circuits and Systems—I: Regular Papers, pp. 1384-1394, vol. 57, No. 6, Jun. 2010, DOI: 10.1109/TCSI.2009.2028643.

In-Hwan Oh, "An Analysis of Current Accuracies in Peak and Hysteretic Current Controlled Power LED Drivers," IEEE, pp. 572-577, 2008, DOI: 10.1109/APEC.2008.4522778.

Dongkyung Park, Zhidong Liu, Hoi Lee "A 40 V 10 W 93%-Efficiency Current-Accuracy-Enhanced Dimmable LED Driver With Adaptive Timing Difference Compensation for Solid-State Lighting Applications," IEEE Journal of Solid-State Circuits, pp. 1848-1860, vol. 49, No. 8, Aug. 2014, DOI: 10.1109/JSSC.2014.2320951.

Sandip Uprety, Hai-Chen, and Dongsheng Ma, "Quasi-Hysteretic Floating Buck LED Driver with Adaptive Off-Time for Accurate Average Current Control in High Brightness Lighting," IEEE, pp. 2893-2896, 2011, DOI: 10-1109/ISCAS.2011.5938236.

Chinese Patent Application Serial No. 201721321458.2, "First Notification for Correction," dated Mar. 13, 2018, 1 page, English.

Chinese Patent Application Serial No. 201721321458.2, "First Notification for Correction," dated Mar. 13, 2018, 2 pages, Chinese.

Chinese Patent Application Serial No. 201721321458.2, "Request for Recitifcation," dated May 24, 2018, 7 pages, Chinese—Note: For Explanation of Applicant's Response, please see Applicant's Remarks (in bold) on p. 6 of Transmittal Letter submitted herewith.

\* cited by examiner

AVERAGE CURRENT AND FREQUENCY CONTROL

CROSS-REFERENCE TO RELATED APPLICATIONS

The present application claims priority to U.S. Utility application Ser. No. 15/378,517 (the "'517 application"), filed on Dec. 14, 2016, and to U.S. Provisional Application Ser. No. 62/410,937 (the "'937 application"), filed on Oct. 21, 2016 each of which are entitled "Apparatus, Systems and Methods for Average Current and Frequency Control in a Synchronous Buck DC/DC LED Driver," and were filed in the name of inventor Jean-Paul Eggermont, the entire contents of each of the '517 application and the '937 application are incorporated herein by reference.

TECHNICAL FIELD

The technology described herein generally relates apparatus, systems and methods for regulating currents produced by buck converters. The technology may find use in electronic devices, such as light-emitting-diode (LED) lighting applications and in other applications where control of the average currents used to drive LED units and similar types of loads is desired.

BACKGROUND

Today, LED lighting is gaining wide-spread acceptance in automotive, industrial and other lighting applications. As is commonly known and appreciated, LED lighting generally requires less energy to produce a desired quantity of light, where the quantity of light is often expressed in lumens and along a correlated color temperature range, often expressed in degrees Kelvin. In some LED applications, such as automobile front head-light applications, relatively high LED voltages, often ranging between 4 to 50 Volts, and high currents, often ranging from 100 mAmps to 3 Amps, are commonly used. Such LED systems are commonly used to produce a range of Lumens over a given range at a color temperature in degrees Kelvin that is not noticeably perceptible by a driver. The quantity and temperature range of light produced, however, may vary based upon operating, user preference and other considerations. It is to be appreciated that the light produced by LED units is commonly proportional to the current used to drive the LED units. Given these voltage, current, lumen and temperature ranges, the regulation of the current flowing through the LEDs is very important.

As shown in FIG. 1, one common circuit 100 used today to regulate the current flowing through high power LED units utilize circuits that include a similar power source 102, connected to a DC/DC buck converter module 104. The buck converter module 104 commonly includes coils and capacitor which facilitate the storage and discharge of electrical energy, these inherent capabilities buck convertors are referred to herein as providing an energy storage module. Often the buck converter module 104 and related switching components are provided in a common ballast 106, but, may be provided separately or as components of larger systems or units. The principles of operation and elements of such buck converter module 104 are well known in the art and are not described herein but are incorporated herein by reference and by inherency. It is to be appreciated that one or more of the components of the buck converter module and/or the switch 116 shown in FIG. 1 may be replaced and/or augmented by other known circuit components and configurations. For example, diode 126 could be replaced by a N-type field effect transistor (FET) for a synchronous converter.

Further, it is to be appreciated that the electrical characteristics of one or more of the components of a buck converter, as shown for example in FIG. 1 and in FIG. 3 are illustrative only and can be considered to be elements of other components of the embodiments shown. For example, diode 126 can be considered to be a parasitic diode of switch 306 (as shown in FIG. 3). As is commonly known, the output power, as commonly expressed in terms of an LED current $I_{LED}$ and an LED voltage $V_{LED}$, of the buck converter module 104 provides electrical power to one or more LED units 108a,b,c-108n. The LED units 108a,b,c-108n may be driven individually, collectively or some combination in-between by a pixel driver module 110 or a similar module (if any). The pixel driver module 110 may be used to control whether any given LED unit 108a-n is powered or short-circuited, at any given time, by selectively opening/closing irrespectively one or more switches 112. Often the pixel driver module 110 adjusts the opening/closing of the one or more switches 112 in accordance with then desired lighting conditions, as may be sensed, selected or determined based upon ambient light sensors, speed, user preferences, in accordance with regulations and other considerations.

Often a first switch 116, such as an N-channel or P-channel MOSFET transistor, is used to control the operating state, "on" or "off", of the buck converter module 104. The peak current $I_{MAX}$ of the current $I_{LED}$ generated through the buck converter module 104 through switch 116, and thereby to the LED units 108a-n, may be sensed at the output of the buck converter module 104 using, for example, a resistive element 118 and an operational amplifier 120. In other embodiments, other forms of current sensing devices and/or module are often utilized. The voltage across the resistive element 118, as sensed by the operational amplifier, reflects the peak current $I_{MAX}$ provided to the LED units 108a-n at any given time. By controlling the respective "on" and "off" times of the first switch 116, the currents $I_{LED}$ provided to the LED units 108a-n may be regulated.

As shown, buck converter module 104 commonly includes a coil 122 having an inductance L. In high current LED applications and in view of economic, design and other considerations, it is often desirable to reduce the inductance L of the coil 122 and eliminate the need for any external sensing elements such as resistive elements 118 which commonly drain to much power, are expensive, utilize too much physical space on electrical circuit boards and in view of other constraints.

Ideally, a low cost, low inductance system is needed which enables one to regulate the average currents provided to the LED units by the buck converter module 104. These competing desires of low cost, low inductance coils, exclusion of external sensing elements and others, while maintaining a desired average current and power provided to the LED units, with varying voltage demands of such LED units often are further constrained in that a reduction of the coil 122 inductance L often requires an increase in the frequency at which the coil 122 is switched "on" and "off." It is to be appreciated that as the inductance L of coil 122 decreases, the switching frequency of the coil 122 must increase in order to maintain a desired average current and acceptable ripple current provided to the LED units 108a-n.

Further constraining the above considerations and concerns is the need to avoid the generation of undesired electro-magnetic emissions during operation. It is commonly known that buck converters generate Electro-Magnetic Radiation (EMRs). High EMRs can influence the operations of other circuits and components in automobile and other implementations of high power LED units. Accordingly, the Electro-Magnetic Compatibility (EMC) of LED driver units is often highly regulated, especially in motor vehicles. Commonly, EMC concerns limit the permissible frequency range of buck converter modules to 2 MHz±5%. As such, today a need exists to regulate not only the average current but also the switching frequency of LED driver units.

As shown in FIG. 2, today's known circuits (such as the exemplary circuit shown in FIG. 1) commonly attempt to regulate high power LED modules by generating a ripple current R, where the ripple $\Delta IR$ of the LED current, $I_{LED}$ is controlled, over time, by the switching of the first switch 116 "on" and "off." These times are shown in FIG. 2 by $t_{on}$ and $t_{off}$. This successive switching produces an average ripple current $\Delta IR_{avg}$.

In FIG. 2, the "on" time for the first switch 116 is shown by $t_{on}$. The "off" time for the first switch 116 is shown by $t_{off}$, which is proportional to the voltage $V_{LED}$ provided to the LED units 108a-n. That is, for these module designs, it is commonly appreciated that the time off, $t_{off}$ depends on the voltage, $V_{LED}$ of the LED units 108a-n. That is, as $V_{LED}$ increases, $t_{off}$ needs to decrease to maintain a constant current ripple $\Delta IR_{avg}$, and vice versa. This relationship can be expressed mathematically, where L is the value of the coil 122 of the buck converter 104, as follows:

$$(t\text{off} \times V\text{LED})/L = \Delta IR.$$

It is to be appreciated that, per these prior art approaches, the switching frequency is not controlled, and adjustments are continually needed to prevent the peak current of $I_{LED}$ from continually varying in response to variations in the input voltages $V_{IN}$ to the buck converter 104, the properties of the coil 122, and the voltage needs $V_{LED}$ of the LED units 108a-n, where $V_{LED}$ may vary over time based upon the variations in the number of LED units on and off at any given time and the power needs of such LED units.

Further, it is to be appreciated that such designs require the inductance L of the coil 122 to be known and/or the system to be calibrated (and re-calibrated) to such inductance. The inductance of a coil may also vary over time and in response to operating conditions. Further, such commonly known approaches provide only a partial solution, as they still require the inductance L of the coil 122 to be closely matched to input voltages and loads in order provide a desired $V_{LED}$. As such, commonly available approaches today do not permit a driver system to be adaptive to varying inductance/coil values of the buck converter, to variations in the $V_{LED}$ needed at any given time, or to variations in the input voltage $V_{IN}$.

Therefore, an apparatus, system and method is needed for a controlling the average currency of a high-powered DCDC LED driver modules and thereby facilitate the use of low inductance coils, and buck converter modules which can operate independent of the inductance of any given coil used for a particular implementation, the input voltage, and varying load conditions while maintaining the switching frequency of the buck converter module within desired parameters so as to meet EMC compliance requirements, while also minimizing switching power losses. Such an apparatus, system and method desirably facilitates a synchronous mode of operation, using integrated Field Effect Transistors (FETs), while also being compatible for use with external FETs to provide an asynchronous mode of operation.

SUMMARY

In accordance with at least one embodiment of the present disclosure an apparatus, system, or method for powering an electrical load, such as one or more LED units, includes as it components or in conjunction with one more of its operations, a driver module and a regulating module. The driver module may include a buck converter module that is operably connected to an electrical load. The buck converter module may include at least one energy storage module. The driver module may also be configured to include a first switch configured to operably couple a power source to the buck converter module during a first operating state occurring over a first time period. A second switch may also be provided and configured to operably couple the buck converter module to the electrical load during a second operating state occurring over a second time period. During an operating cycle encompassing both the first operating state and the second operating state, a first current sensor may be configured to sense the electrical current provided to the electrical load while the apparatus is operating in the first state and output a first current sensed signal. A second current sensor may be configured to sense the electrical current provided to the electrical load while the apparatus is operating during the second state and output a second current sensed signal. A regulating module may be configured to be operable to instruct and regulate the time periods during which each of the first switch and the second switch are configured into at least one of the first operating state and the second operating state such that a maximum current and a minimum current are provided by a buck converter module to the load over a given cycle and such maximum and minimum currents are symmetrically disposed about an average current provided to the load during the operating cycle.

In accordance with at least one embodiment of the present disclosure, the first operating state occurs during a first "on" time period, while the second operating state occurs during a second "off" time period. It is to be appreciated that an operating cycle for the buck converter module includes the combination of a given "on" time period with an immediately succeeding "off" time period. It is further to be appreciated that during the first operating state, the buck converter module may be configured to provide power to the electrical load and stores power in the electrical storage module. Further, during the second operating state, the power stored by the energy storage module during the first operating state may be discharged to the electrical load. Further, during the first time period the regulating module may be configured to instruct the first switch to close and substantially simultaneously therewith instruct the second switch to open. In accordance with at least one embodiment, during the second time period the regulating module may be configured to instruct the first switch to open and substantially simultaneously instructs the second switch to close.

In accordance with at least one embodiment of the present disclosure, an apparatus, system or method for powering an electrical load may include the use of a regulating module, which regulates a maximum current provided by a buck converter module to a load during the first time period. The regulating module and operations thereof may also be configured to regulate a minimum current provided by the buck converter module to the load during a second time period. Further, by regulating the maximum and minimum currents provided, the regulating module regulates the average current at a target current for the load for a given operating cycle of a DCDC buck converter. In accordance with at least one embodiment, the regulating module may be configured to include a first comparator module coupled to a second current sensor and configured to detect when the minimum current provided to the load reaches a target minimum current. Per at least one embodiment, when the target minimum current is detected, a set signal may be outputted. The regulating module may also include a period compare module, coupled to the at least one comparator module, and configured to measure, upon receipt of the set signal, an amount of time required for the minimum current provided to the load to reach the target minimum current. Per at least one embodiment, the period compare module may be configured to compare for each of a first cycle and a second cycle the time when the minimum current provided to the load reaches the target minimum current for that cycle and output a result of the comparison.

In accordance with at least one embodiment, a regulating module may be configured to include an adjustment module. The adjustment module may be coupled to a period compare module and configured to receive and inverse the outputs of the period compare module. Per at least one embodiment, the inverse of the result of the outputs from the period compare module indicate a switching frequency of a driver module. Based on a comparison of the switching frequency of a current cycle to a target switching frequency, an output signal may be generated as a current adjustment signal. Per at least one embodiment, the current adjustment signal may indicate an amount of change desired in the current to be provided to the load during the next cycle.

In accordance with at least one embodiment, a regulating module may be configured to include at least one summing module. The summing module may be coupled to an adjustment module and configured to receive a target current signal and modify the target current signal based on the current adjustment signal generated by the frequency adjustment module. The summing module may also be configured to produce a desired minimum current for the load for a next operating cycle by subtracting the current adjustment signal from the target current. Per at least one embodiment, the regulating module may also include a second comparator module, coupled to a first current sensor, and configured to detect when a maximum current provided to a load reaches a target maximum current and, when such detection occurs, output a reset signal. Per at least one embodiment, the second comparator module may be configured to detect when the maximum current reaches the target maximum current by comparing a first current sensed signals received by the second comparator module for a then arising operating cycle against a desired maximum current for the next operating cycle. Per at least one embodiment, the desired maximum current may be provided to the second comparator module by a summing module and the desired maximum current is the result of the addition of the current adjustment signal for the present operating cycle to the target current. Per at least one embodiment, a determination of a desired maximum current may occur during an operating cycle occurring immediately previous to the current operating cycle.

In accordance with at least one embodiment of the present disclosure, an apparatus, system or method for powering an electrical load may include the use of a regulating module, wherein a first current sensor and the second current sensor are combined into a joint current sensor configured to detect the current provide to the load during each of the first operating state and the second operating states. Per at least one embodiment, the regulating module may include a first comparator module and a second comparator module that are combined into a joint comparator module. Per at least one embodiment, at least one summing module may be included and configured to add a current adjustment signal to a target current during a first operating state so as to provide a desired maximum current for a next operating cycle. Per at least one embodiment, at least one summing module may be configured to subtract a current adjustment signal from a target current during a second operating state to provide a desired minimum current for a next operating cycle. Per at least one embodiment, the regulating module may include a multiplexer, coupled to at least one summing module, and configured to provide to a joint comparator module, for use during a next operating cycle, a desired maximum current to be reached during a first operating state and a desired minimum current to be reached during a second operating state.

In accordance with at least one embodiment of the present disclosure, an apparatus, system and method for powering an electrical load is provided and may include a driver module. The drive module may be configured to include a buck converter module. The buck converter module may be operably connected to an electrical load, such as one or more LED units. The buck converter module may be a DCDC buck converter and may include at least one energy storage module, such as one provided by an inductive-capacitive circuit. The drive module may also be configured to include, for at least one embodiment, a first switch configured to operably couple a power source to the buck converter module during a first operating state. The first operating state may occur over a first time period. The drive module may be configured to include, for at least one embodiment, a second switch configured to operably couple the buck converter module to the electrical load during a second operating state. The second operating state may occur over a second time period which follows a first time period. An operating cycle for the buck converter may include both the first operating state and the second operating state, such that the first operating state occurs during a first "on" time period and the second operating state occurs during a second "off" time period. Per at least one embodiment, an operating cycle for the buck converter module may include a combination of a given "on" time period with an immediately succeeding "off" time period.

Per at least one embodiment, a first current sensor configured to sense the electrical current provided to the electrical load while the apparatus is operating in the first state and output a first current sensed signal may be included. Likewise, a second current sensor configured to sense the electrical current provided to the electrical load while the apparatus is operating in the second state and output a second current sensed signal may be included.

A regulating module, per at least one embodiment, may include a first comparator module coupled to a second current sensor and configured to detect when a minimum current provided to a load reaches a target minimum current and, when such detection occurs, output a set signal. Per at least one embodiment, a period compare module may be included in the regulating module. The period compare module may be coupled to at least one comparator module and configured to measure an amount of time required for a minimum current provided to a load to reach a target minimum current.

Per at least one embodiment, a regulating module may be configured to instruct and regulate one or more time periods during which each of a first switch and a second switch are configured into at least one of a first operating state and a second operating state such that a maximum current and a minimum current provided by a buck converter module to the load over a given cycle are symmetrically disposed about an average current provided to the load during that same operating cycle.

In accordance with at least one embodiment of the present disclosure an apparatus for regulating the currents provided by a DCDC buck converters to an LED unit, may be configured to include a regulating module operable to instruct and regulate the time periods during which each of a first switch and a second switch of a driver module are configured into at least one of the first operating state and a second operating state such that a maximum current and a minimum current are provided by a buck converter module to an LED unit over a given operating cycle are symmetrically disposed about an average current provided to the LED unit during the given operating cycle.

BRIEF DESCRIPTION OF THE DRAWINGS

The features, aspects, advantages, functions, modules and components of the apparatus, systems and methods provided by the various embodiments of the present disclosure are further disclosed herein with regard to at least one of the following descriptions and accompanying drawing figures.

DETAILED DESCRIPTION

The various embodiments described herein are directed to apparatus, systems and methods by which the average current of a direct current (DC) buck converter module may be regulated. While the various embodiments set forth herein, and as shown in the attached drawing figures, provide sufficient information for a person of ordinary skill in the art to practice one or more of the inventions, as claimed herein or as later claimed in any application claiming priority to this disclosure, it is to be appreciated that one or more embodiments may be practiced without one or more of the details provided herein. As such, the various embodiments described herein are provided by way of example and are not intended and should not be used to limit the scope of any invention claimed to any particular embodiment.

Figure 1:
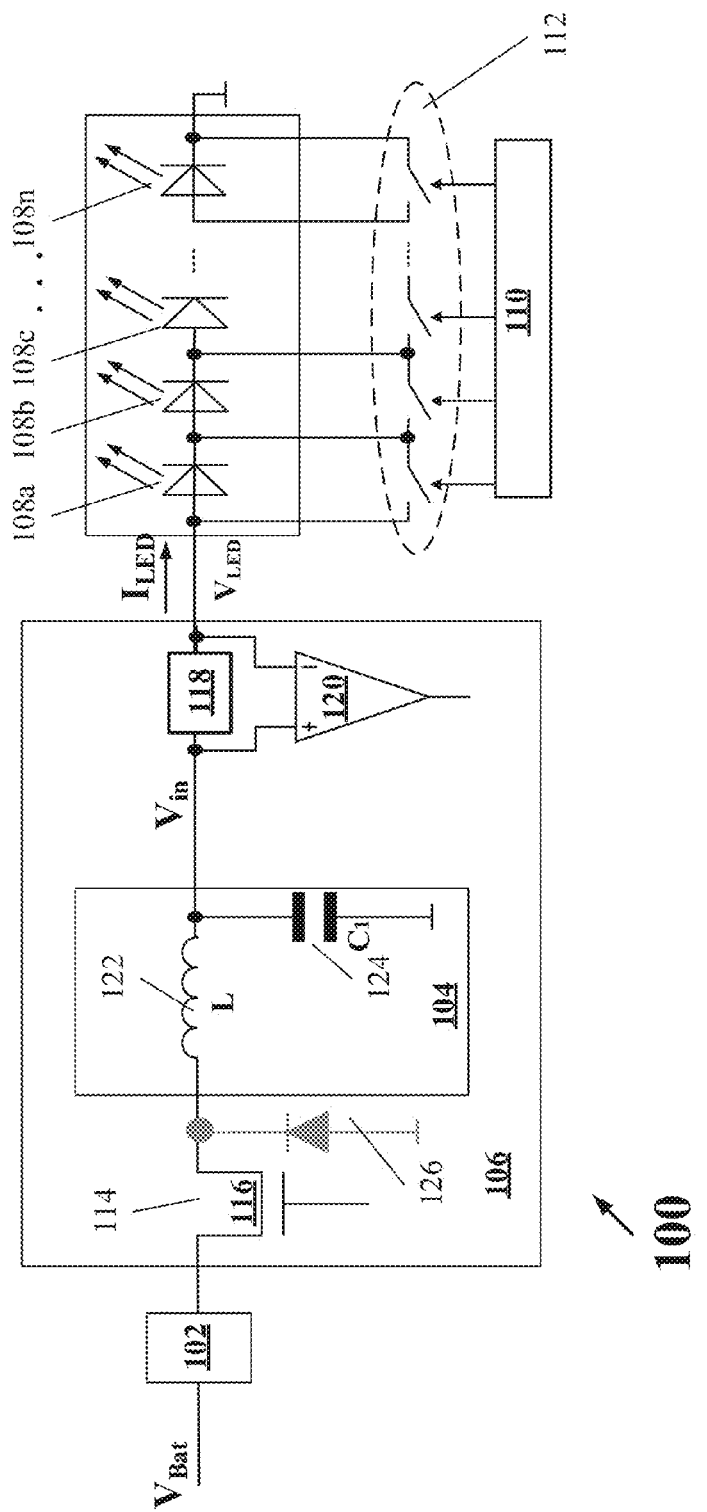
FIG. 1 is schematic representation of a prior art approach to regulating the operation of buck converters driving LED units.
Figure 2:
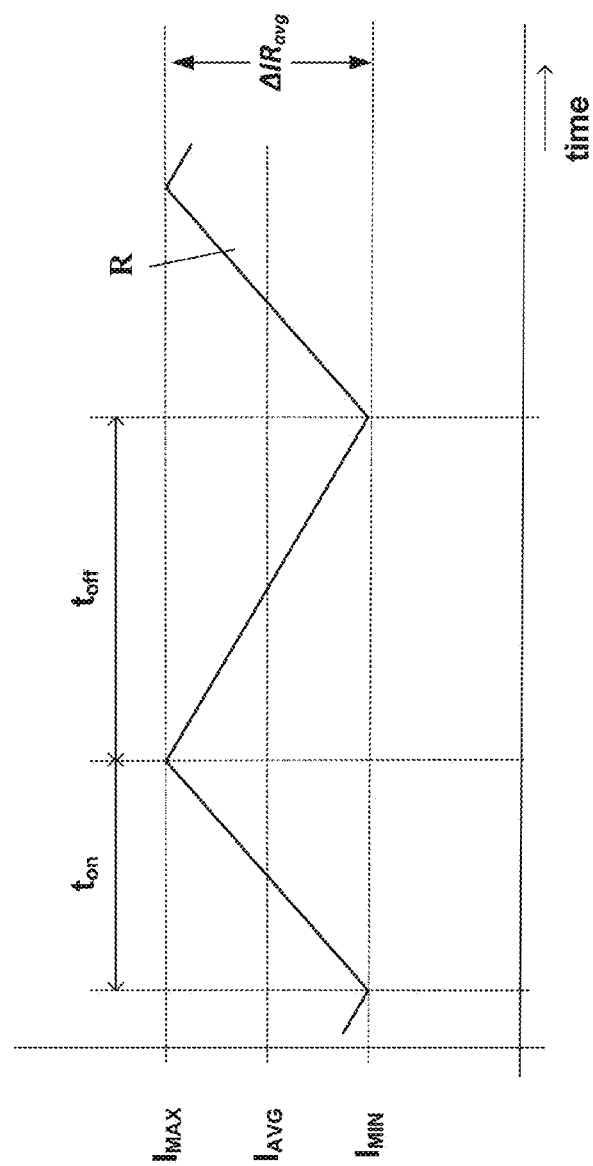
FIG. 2 is a timing diagram illustrating the resulting ripple current that may be produced in conjunction with the use of the prior art approach of FIG. 1.
Figure 3:
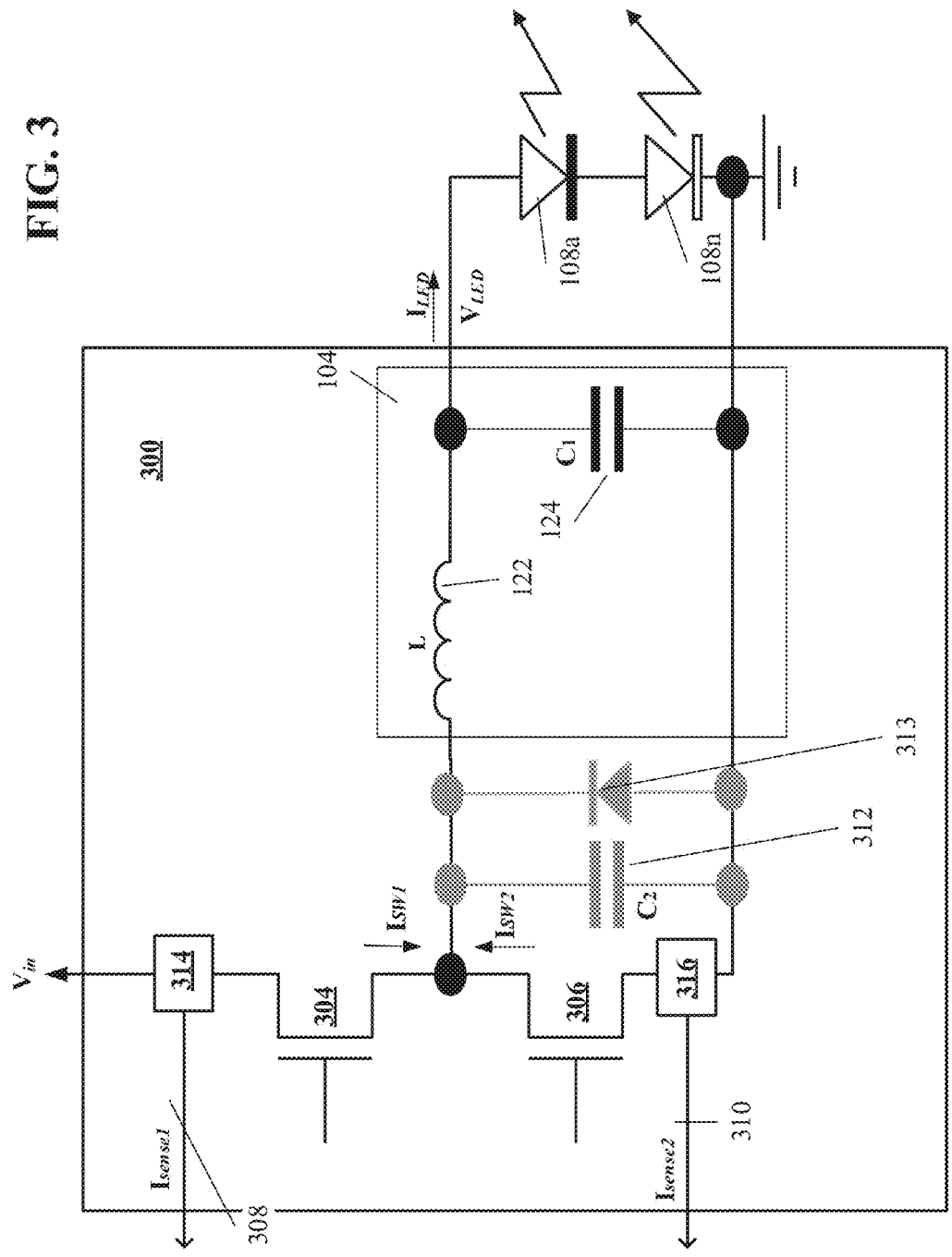
FIG. 3 is a schematic diagram illustrating an apparatus, a driver module, for use in regulating the operation of a buck converter module, by regulating the average current produced by the buck converter module, in accordance with at least one embodiment of the present disclosure.

As shown in FIG. 3 and for at least one embodiment of the present disclosure, a driver module 300 is provided for sensing and regulating the current, $I_{LED}$, provided to one or more LED units 108a-n. Driver module 300 may include a DCDC buck converter module 104.

It is to be appreciated, that current $I_{LED}$ will vary over time and is the same as the current produced by buck converter module 104 at any given time. Buck converter module 104 includes a coil 122 having an inductance L, a capacitor 124 having a capacitance $C_1$, and at least one "high" switch 304 and one diode 313. It is to be appreciated that for at least one embodiment of the present disclosure, the sensing and regulating of current $I_{LED}$ is independent of the inductance and capacitances used for any given implementation. The inductance and capacitance values being used for the DCDC buck converter module 104 may be selected by a person of ordinary skill in the art based upon well-known electrical circuit design principles which are incorporated herein by reference and by inherency.

Driver module 300 may be configured to include two switches, "hi" switch 304 and "low" switch 306, which are used to control the "on" and "off" cycles of buck converter module 104. In accordance with at least one embodiment, switches 304 and 306 may be MOSFET transistors. In FIG. 3, elements 312 and 313 respectively represent the parasitic capacitance and parasitic diode properties of low switch 306. In other embodiments, other type of transistor or other switches may be utilized. The current $I_{SW1}$ across "hi" switch 304 and the current $I_{SW2}$ across "low" switch 306 are sensed during their respective "on" times by respective hi current sensor module 314 and low current sensor module 316. Any known devices, modules, techniques or otherwise may be used to monitor the currents flowing across the respective hi switch 304 and low switch 306 during the respective states of operation of the driver module 300. One example of such known current sensing devices is the user of a sensing resistor. Further, it is to be appreciated that internal current sensing on one or both of the hi switch 304 and the low switch 306 may be used in one or more embodiments of the present disclosure.

Figure 5:
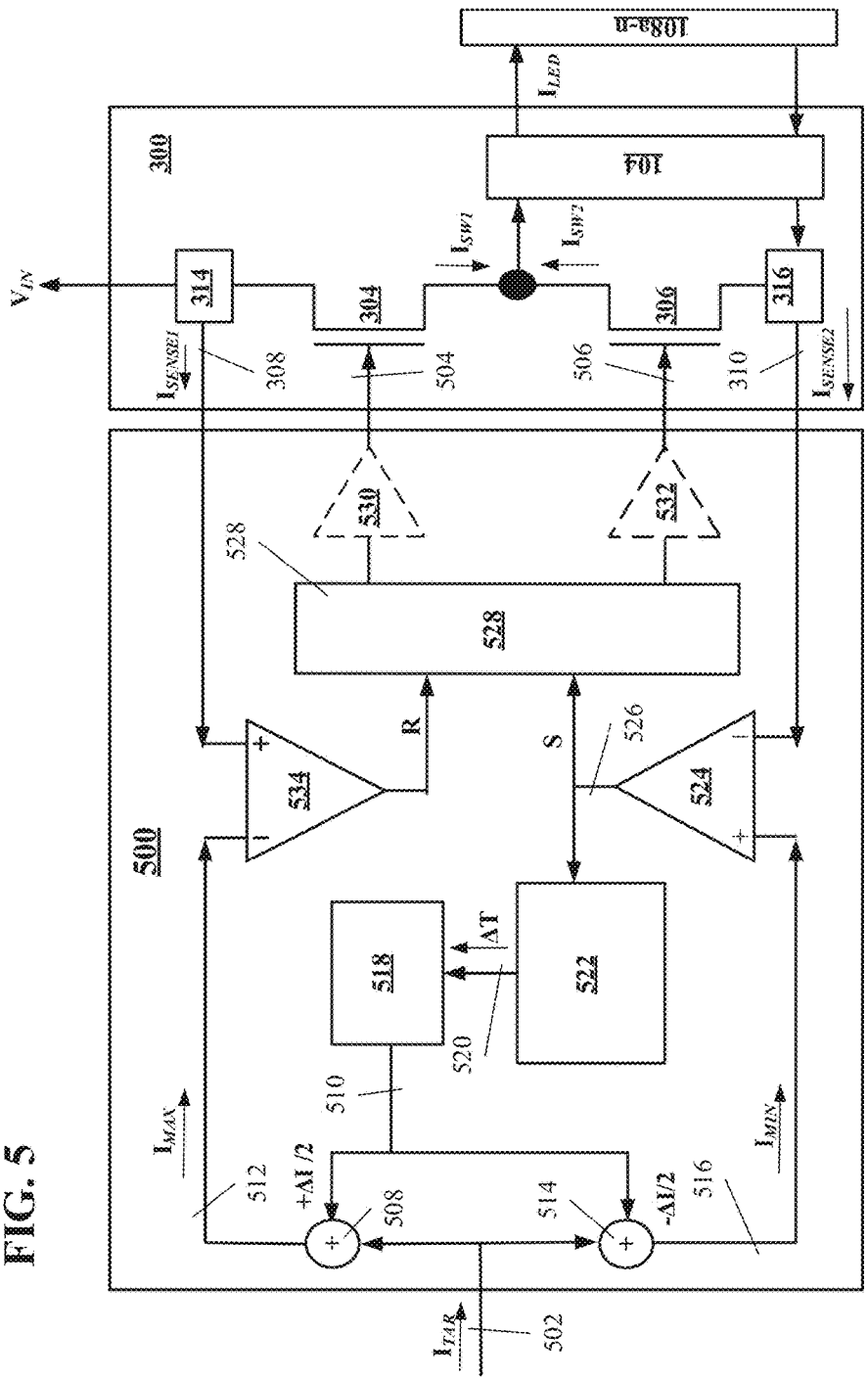
FIG. 5 is a schematic diagram illustrating an apparatus, a regulating module, for use in controlling the principles of operation of the driver module of FIG. 3, in accordance with at least one embodiment of the present disclosure.

As further shown in FIG. 3 and as additionally shown in FIG. 5, "hi" lead 308 and "low" lead 310 couple driver module 300 with regulating module 500. At least one embodiment of regulating module 500 is described below and shown in FIG. 5. Leads 308 and 310 respectively communicate signals $I_{sense1}$ and $I_{sense2}$ representative of currents $I_{SW1}$ and $I_{SW2}$, from driver module 300 to regulating module 500.

As further shown for at least the embodiment illustrated in FIG. 5, driver module 300 receives power $V_{in}$ from a source 102 (not shown in FIG. 3) or another power source. It is to be appreciated that driver module 300 may receive power from any source configured to provide the desired voltage or voltage ranges. Such power sources are well-known in the art and are incorporated herein by reference and inherency. In accordance with at least one embodiment of the present disclosure, $V_{in}$=12 volts DC and $V_{LED}$=10 volts DC may be possible values.

Figure 4A:
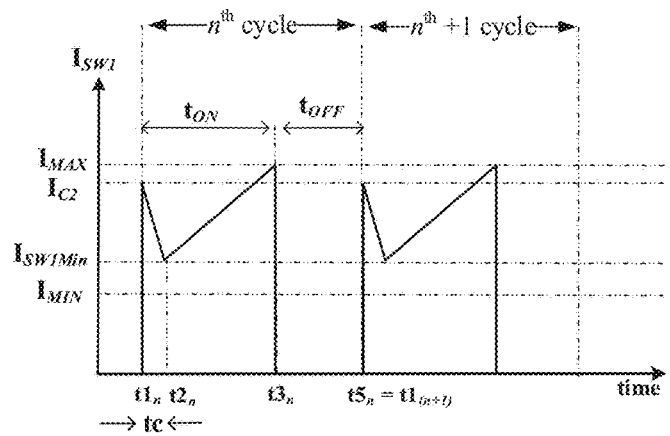
FIG. 4A is a timing diagram illustrating the principles of operation of a first, "hi" switch used in the apparatus of FIG. 3 and in accordance with at least one embodiment of the present disclosure.
Figure 4B:
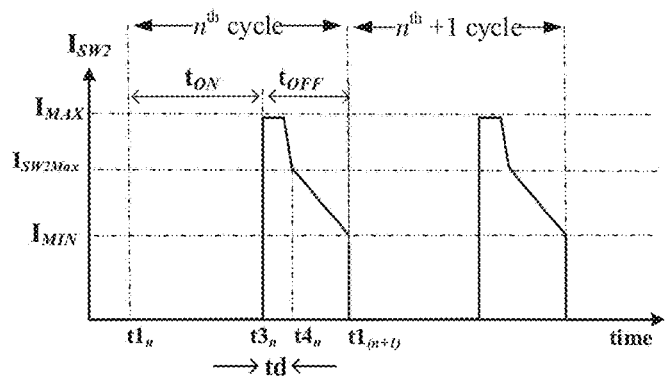
FIG. 4B is a timing diagram illustrating the principles of operation of a second, "low" switch used in the apparatus of FIG. 3, and in accordance with at least one embodiment of the present disclosure.
Figure 4C:
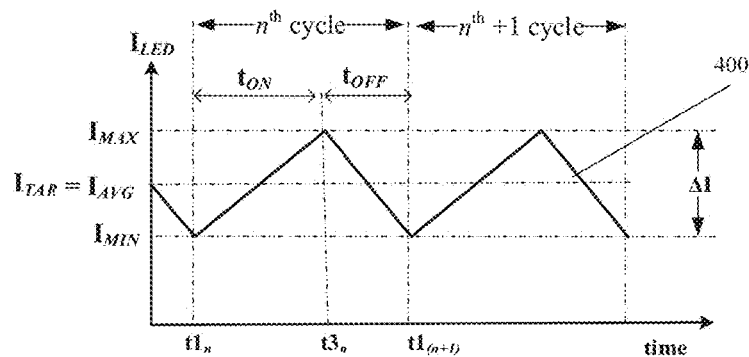
FIG. 4C is a timing diagram illustrating the regulation of the average current provided by a buck driver module to at least one LED unit, as the operation of such buck driver module is regulated per the apparatus of FIG. 3 and in accordance with at least one embodiment of the present disclosure.

The principles of operation of driver module 300 are shown in FIGS. 4A, 4B and 4C, where FIG. 4A shows the characteristics of current $I_{SW1}$, FIG. 4B shows the characteristics of current $I_{SW2}$, and FIG. 4C shows the resulting $I_{LED}$ current provided to the LED units by the buck converter module 104. More specifically, in FIGS. 4A, 4B and 4C, those time periods when the buck converter module 104 is considered "on" and "off" are respectively shown as times $t_{ON}$ and $t_{OFF}$. In accordance with the present naming convention, $t_{ON}$ represents time period $t1_n$ to $t3_n$, where n is an integer and represents a given cycle of operation of the buck converter module, where a single cycle includes the time period occurring from when the buck converter module is switched into an "on" state, then to an "off" state and then to immediately prior to it returning to an "on" state). More specifically, when hi switch 304 is "closed" and low switch 306 is "open", the buck converter module is considered to be in the "on" state. Contrarily, $t_{OFF}$ represents the time period from $t3_n$ to $t5_n$, where $t5_n = t1_{(n+1)}$ and $t5_n$ and $t1_{(n+1)}$ both represent the beginning of the next cycle for the buck converter module 104. That is $t_{OFF}$ occurs when hi switch 304 is open and low switch 306 is closed. It is to be appreciated that for at least one embodiment, the operating states (on/off) of hi switch 304 and low switch 306 are diametrically opposed. In accordance with other embodiments, some delay and overlap in respective "on" and "off" times may occur between the irrespective "on" and "off" states of the hi and low switches 304 and 306 respectively. For purposes of this disclosure, such delays, when arising in the Nano-Second range of 1 ηSec. to 10 ηSec. are considered to be insubstantial, such that for all practical purposes the switching "on" and "off" (and the inverse operations thereof) of the hi switch 304 and the low switches 306 res are considered to occur substantially simultaneously.

In at least one embodiment, time $t3_n$, which as shown in FIG. 4A is the beginning of the $t_{OFF}$ period, is determined to occur when the $I_{sense1}$ current reaches $I_{MAX}$. Similarly, for at least one embodiment, time $t5_n=(t1_{(n+1)})$ is determined to occur when the $I_{sense2}$ current reaches $I_{MIN}$. It is to be appreciated that by adjusting the values of $I_{MAX}$ and $I_{MIN}$ the time periods $t3_n$, and $t5_n(t1_{(n+1)})$ are obtained. By adjusting the values $I_{MAX}$ and $I_{MIN}$, symmetry of $I_{MAX}$ and $I_{MIN}$ relative to a desired target current $I_{TAR}$ the resulting average current $I_{AVG}$ can be obtained and equaling a desired target current $I_{TAR}$, where the target current is the desired operating current for the LED units 108a-n. It is to be appreciated that $I_{TAR}$ may be pre-determined, specified in advance, determined experimentally, calibrated once or repeatedly or may be otherwise identified for use in accordance with a given one or more LED units 108a-n. It is to be further appreciated that the value of $I_{TAR}$ may vary in accordance with the principles of operations used in conjunction with a given (if any) pixel driver module 110 used in conjunction with one or more embodiments of the present disclosure.

As shown in FIG. 4A for at least one embodiment of the present disclosure, time tc represents the time period $t1_n$ to $t2_n$ used to charge the parasitic and/or additional capacitance $C_2$ of the buck converter module 304. As discussed above, such parasitic capacitance, as represented by element 312, may arise, for example, in association with the activation of the hi switch 304 itself, or otherwise. As shown, during the charging of second capacitance, current $I_{SW1}$ through hi switch 304 initially has a peak current $I_{C2}$. For at least one embodiment, current $I_{SW1}$ sensed during time period tc may be masked and is not used to regulate the average current provided by driver module 300 to LED units 108a-n. After time period tc current $I_{SW1}$ may be sensed and generally increases from a value $I_{SW1Min}$ to the maximum current $I_{MAX}$ provided by driver module 104 to the LED units 108a-n. Accordingly, the currents sensed $I_{SENSE1}$ and used by regulating module 500 to regulate the operation of driver module 300 may be expressed mathematically, for any given cycle n, as shown in Equation 1.

$$I_{SENSE1} = I_{sw1} \qquad \text{Equation 1:}$$

Per Equation 1, for any given cycle n, $t2_n$ is the time from when the current sensed by high current sensor 314 is representative of the coil current while the hi switch 304 is "on", and $t3_n$ is the time at which the hi switch 304 is turned "off."

As shown in FIG. 4B for at least one embodiment of the present disclosure, after the hi switch 304 is turned off at time $t3_n$, low switch 306 is turned on and diode 126 reverses the node of the buck converter 104 to the low switch 306. At the beginning of the "off" time $t_{OFF}$, at time $t3_n$, the sensed current $I_{SW2}$ flowing through low switch 306 initially presents itself as a recovery current induced by diode 126. The recovery current generally occurs over time period $t3_n$ to $t4_n$, which is represented in FIG. 4B by time period td. For at least one embodiment, current $I_{SW2}$ sensed during time period td may be masked and may not be sampled or otherwise used to regulate the average current provided by driver module 300 to LED units 108a-n. After time period td current $I_{SW2}$ may be sensed and generally decreases from a value $I_{SW2Max}$ to the minimum current $I_{MIN}$ provided by driver module 104 to the LED units 108a-n. Accordingly, the currents $I_{SENSE2}$ used by regulating module 500 to regulate the operation of driver module 300 during its "off" state may be expressed mathematically, for any given cycle n, as shown in Equation 2.

$$I_{SENSE2} = I_{sw2} \qquad \text{Equation 2:}$$

For any given cycle n, $t4_n$ is the time from when the current sensed by low current sensor 306 is representative of the coil current while the low switch 306 is "on", and $t1_{(n+1)}$ is the time at which the low switch 306 is turned "off" and the cycle then repeats.

As shown in FIG. 4C, the "on" and "off" states of the driver module 300 may be adjusted such that the $I_{MAX}$ and $I_{MIN}$ values are symmetrical around the $I_{TAR}$ current and the resulting current $I_{LED}$ provided to the LED units 108a-n can be set at the target average current $I_{TAR}$. That is, the average LED current $I_{AVG}=I_{TAR}$ when symmetry exists. Such symmetry may be expressed as the change in current $\Delta I$ over a cycle where the change ranges from $I_{MAX}$ to $I_{MIN}$. It is to be appreciated that ideally, half this change $$\frac{\Delta I}{2}$$

(the current adjustment) arises, respectively, above and below the average current $I_{AVG}$ such that symmetry exists. This relationship is expressed in Equation 3.

$$I_{MAX} - \frac{\Delta I}{2} = I_{MIN} + \frac{\Delta I}{2} = I_{TAR} \qquad \text{Equation 3}$$

Per Equation 3, $I_{AVG}$ may be expressed in terms of the peaks (which are shown in FIG. 4C as the $I_{MAX}$ value at time $t3''$) and valleys (which are shown in FIG. 4C as the $I_{MIN}$ value at time $t1^{(n+1)}$) of the current $I_{LED}$ 400 provided by driver module 300 to the LED units 108a-n. This relationship may also be expressed in terms of such ΔI's, as shown in Equation 4.

$$I_{AVG} = \frac{I_{MAX} + I_{MIN}}{2} = \frac{\left(I_{TAR} + \frac{\Delta I}{2}\right) + \left(I_{TAR} - \frac{\Delta I}{2}\right)}{2} = I_{TAR} \quad \text{Equation 4}$$

Further, it should be appreciated that when symmetry exists between $I_{MAX}$ and $I_{MIN}$, $I_{TAR}$ does not depend on the inductance value L of coil 122. Likewise, $I_{TAR}$ does not depend on the voltage $V_{in}$ provided, for example, by a power source 102, or on the load (expressed as the output voltage $V_{LED}$) needed by LED units 108a-n at any given time. Further, it should be appreciated that when symmetry exists between $I_{MAX}$ and $I_{MIN}$ around $I_{TAR}$, the average LED value $I_{AVG}$ does not depend at all on ΔI value. It means that ΔI value is free to be controlled independently to the desired LED value $I_{TAR}$.

Further, it is to be appreciated that the LED current commonly presents itself, over one cycle to a next, as a constantly varying current $I_{LED}$ 400 whose boundaries at any given instance in time are defined by $I_{MAX}$, when driver module 300 is "on", and, by $I_{MIN}$, when driver module 300 is "off".

The "on" and "off" times of driver module 300 can also be expressed in terms of the switching frequency $\mathcal{F}_n$ of the driver module 300, where the frequency $\mathcal{F}_n$ is inversely proportional to the time length $T_n$ of any given cycle n, where the length of any given cycle is the time period $T_n$ as shown in Equation 5.

$$\mathcal{F}_n = 1/(t_{ONn} + t_{OFFn}) = 1/T_n. \quad \text{Equation 5:}$$

Accordingly, for at least one embodiment of the present disclosure, the switching frequency $\mathcal{F}_n$ can be expressed in terms of a target switching period $T_{TAR}$ for driver module 300, which can also be expressed in terms of the voltages and inductance properties of a given driver module, for any given cycle n, as shown in Equation 6.

$$\mathcal{F}(n) = \frac{1}{T} = \frac{1}{T_{TAR}} \cong \frac{V_{LED} \cdot (V_{IN} - V_{LED})}{\Delta I \cdot L \cdot V_{IN}} \quad \text{Equation 6}$$

In view of these expressions and relationships, and as discussed further below with reference to FIG. 5, regulating module 500 may control the $I_{LED}$ current at the desired $I_{TAR} = I_{AVG}$ value by adjusting the $I_{MAX}$ and $I_{MIN}$ threshold limits symmetrically above and below $I_{TAR}$ independently of ΔI value according to Equation 4 as well as regulating module 500 may control the frequency $\mathcal{F}_n$ of each cycle as well as the timing of when driver module 300 switches from the "on" to "off" states within any given cycle by adjusting the ΔI value according to Equation 6.

Referring now to FIG. 5 for at least one embodiment of the present disclosure, a regulating module 500 for controlling the switching frequency of a driver module 300 as well as the respective "on" and "off" times of such a driver module 300 is shown. The regulating module 500 may be coupled to hi lead 308, low lead 310, target input lead 502, hi switch lead 504, and low switch lead 506. It is to be appreciated that other leads, such as power, programming, ground, clocking and others and/or other commonly used components may be utilized, but, are not shown in FIG. 5.

Regulating module 500 may include a first summing module 508 coupled to each of the target input lead 502, adjustment lead 510, and max. current lead 512. First summing module 508 may be configured to sum a target current signal, $I_{TAR}$, received via lead 502, with a current adjustment signal ΔI/2, received via lead 510, and output the resulting $I_{MAX}$ current signal via lead 512.

Regulating module 500 may include a second summing module 514 coupled to each of the target input lead 502, adjustment lead 510, and min. current lead 516. Second summing module 514 may be configured to sum the target current signal, $I_{TAR}$, received via lead 502, with the opposite sign value of the current adjustment signal ΔI/2 received via lead 510, and output the resulting $I_{MIN}$ current signal via lead 516. It is to be appreciated, that while shown in the embodiment of FIG. 5 as utilizing two summing modules, 508 and 514, such modules may be provided in a single module where the value of the adjustment signal 510 varies based on the state (i.e., "on" or "off") of the driver module 300 at any given time.

As further shown for at least the embodiment depicted in FIG. 5, regulating module 500 may also be configured to include a frequency adjustment module 518, which outputs the current adjustment signal ΔI/2. For at least one embodiment, the frequency adjustment module 518 will output a stable adjustment signal ΔI/2 within a given number of pre-determined cycles following initiation of the driver module for a first cycle at time t1[1]. In at least one embodiment, the frequency adjustment module 518 may be replaced by any module adjusting symmetrically $I_{MAX}$ and $I_{MIN}$ threshold currents versus the target average current $I_{TAR}$ via any regulation technique. Examples of such regulation techniques include but are not limited to proportional, integral-proportional, derivative-integral-proportional and other known techniques.

It is to be appreciated that in accordance with at least one embodiment of the present disclosure, for an ideal implementation, the combinations of summing modules 508 and 514 and the signal amplitude of current adjustment signal ΔI/2 may result in $I_{AVG}$ commonly being equal to $I_{TAR}$, with any differences, if any, not effecting the mode of operation of the LED units 108a-n. It is to be appreciated that in non-ideal implementations, pure symmetry may not arise due to, for example, current losses occurring during switching activities, comparator 534 and 524 delays, delays in sensing elements 314 and 316, errors in summing modules 508 and 514, comparator offsets in 534 and 524, delay in pre-drivers 530, 532 or in transistors 304 and 306, delay in control module 528 and the like. Generally, any such differences may result in insubstantial decreases in the performance of the LED units 108a-n. Such insubstantial differences arising within known and/or expected performance ranges for the LED units 108a-n. Further, it is to be appreciated that, for an ideal circuit, when $I_{AVG} = I_{TAR}$ the LED current $I_{LED}$ does not need to be regulated and will instead be correctly set at the desired current.

In accordance with at least one embodiment of the present disclosure, it is to be appreciated that the effective average current $I_{EAVG}$ may be sensed by any state-of-the-art technique not presented here. The effective average current $I_{EAVG}$ could be provided to each of the first and second summing modules 508 and 514 as a second order correction signal. It is to be appreciated that such a second order correction signal may allow for the apparatus to adjust for errors that otherwise arise from the use of non-ideal components.

Frequency adjustment module 518 may be operably coupled, via change time period lead 520, to a period compare module 522. As further shown for at least one embodiment of the present disclosure, the period compare module 522 may be configured to determine the state of operation of the driver module 300 based, for example on detecting when the time period signal ΔT occurs. It is to be appreciated that for at least one embodiment of the present disclosure the period compare module 522 may be replaced by a module which compares an actual switching period (or frequency) to a target switching period (or frequency) over multiple cycles. Such a period compare module 522 may be utilized to flush-out permutations arising under operating conditions where the load demanded by the LED units 108a-n are rapidly changing, as may be the case, for example, when strobing, rapidly flashing or similar modes of operation may be desired. Further, it should be appreciated that the period compare module 522 may be implemented in either the analog circuit or digital circuits and processing domains.

It is to be appreciated that for at least one embodiment, the period compare module 522 may compare the total time periods T or a portion thereof, such as $t_{ON}$ or $t_{OFF}$ as arising from one cycle to a next. In one embodiment, only the actual versus target "off" times for the driver module 300 are compared and for at least one embodiment $\Delta T = \Delta t_{OFF} = t_{OFF}^{(n)} - t_{OFF(n-1)}$. The inverse of ΔT is the desired switching frequency for the driver module 300. For at least one embodiment, the desired switching frequency is, for example, 2 MHz, and the corresponding target period is 500 ns.

As further shown for at least the embodiment depicted in FIG. 5, regulating module 500 may also be configured to include a low comparator module 524 which is coupled to each of the period compare module 522 (via "set" lead 526), the second summing module 514 (via min current lead 516) and to the low current sensor module 316 (via low lead 310). Low comparator module 524 may be configured to monitor when the $I_{SENSE2}$ current signal provided via the low lead 310 is equal to the $I_{MIN}$ threshold provided to the low comparator module 524 by the second summing module 514. As discussed previously above, when $I_{SENSE2} = I_{MIN}$ a new cycle for the driver module 300 occurs. Accordingly, upon detecting $I_{SENSE2} = I_{MIN}$ the low comparator module 524 outputs a "set" signal S, which designates the start of $t_{ON}$ and a new (n+1) cycle, to each of the period compare module 522 (via set lead 526) and to a driver control module 528.

As further shown for at least the embodiment depicted in FIG. 5, the driver control module 528 may be configured, upon receiving the set signal S to initiate the closing of the hi switch 304 and the opening of the low switch 306, with the sequence of operation commencing from time periods $t1_n$ through $t3_n$, as shown in FIG. 4A, with the "on" state.

As shown for at least one embodiment of the present disclosure, driver control module 528 may be coupled via (optional) high switch module 530 and (optional) low switch module 532 to the respective hi switch 304 and low switch 306, via respective hi switch lead 504 and low switch lead 506. It is to be appreciated that the high switch module 530 and low switch module 532 are designated as optional components of regulating module 500 as the need for signal condition, including amplification, filtering or otherwise may vary based upon actual implementations of one or more of the embodiments described herein.

As further shown for at least the embodiment depicted in FIG. 5, regulating module 500 may also be configured to include a hi comparator module 534. Hi comparator module 534 may be coupled to each of hi current sensor module 314 (via hi lead 308) and to first summing module 508 (via max current lead 512). Hi comparator module 534 may be configured to monitor when the $I_{SENSE1}$ current signal provided via the hi lead 308 is equal to the $I_{MAX}$ threshold provided by the first summing module 508. As discussed previously above, when $I_{SENSE1} = I_{MAX}$ the "off" portion of a given cycle n for the driver module 300 is deemed to occur. Accordingly, upon detecting $I_{SENSE1} = I_{MAX}$ the hi comparator module 534 outputs a "reset" signal R, which designates the start of $t_{OFF}$ to the driver control module 528. It is to be appreciated that in accordance with at least one embodiment, the period compare module 522, or a second period compare module (not shown), may be utilized to provide further refinement of the $I_{MAX}$ currents which, when sensed by hi current sensor 314, initiate the triggering of the "off" period. That is, it is to be appreciated that the hi comparator module 534 may be configured to also communicate the reset signal R to the period compare module 522, which, in turn, determines whether any difference have occurred between the actual $t_{OFF}$ time and the $t_{OFF}$ target time and, if so, instructs the frequency adjustment module to output an adjustment signal ΔI/2 specifically targeted for increasing (or decreasing) the $I_{MAX}$ current signal. That is, it is to be appreciated that for one or more embodiments, separate adjustment signals ΔI/2 may be output by the adjustment module 518 so as to separately adjust the $I_{MAX}$ and $I_{MIN}$ current signals, as then being adjusted based on the then operating state of driver module 300. Such separate adjustments may be desired, for example, when adjustments to only one of the $I_{MAX}$ and $I_{MIN}$ current signals, and not both, is desired so as to provide a more precise symmetry of $I_{MAX}$ and $I_{MIN}$ with respect to $I_{AVG}$. It is to be appreciated that such separate adjustment may arise in view of one or more operational, environmental or other constraints.

Figure 6:
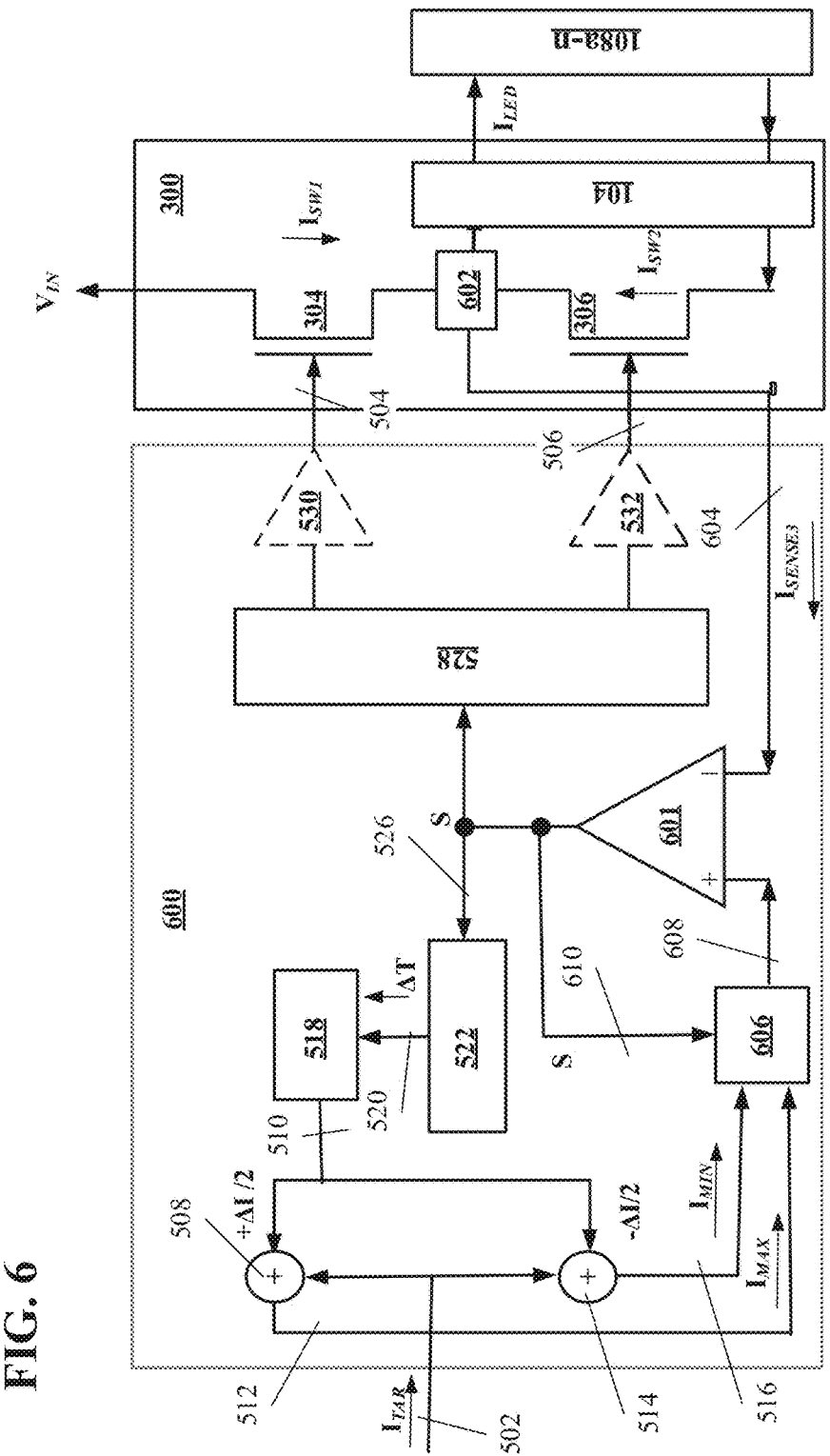
FIG. 6 is a schematic diagram illustrating an apparatus, a second regulating module, for use in controlling the principles of operation of the driver module of FIG. 3, in accordance with at least one embodiment of the present disclosure

Referring now to FIG. 6 and with respect to at least one embodiment of the present disclosure, a second regulating module 600 may be provided which may be configured for use with a single current sensing module 602. Per at least this embodiment, it is to be appreciated that the hi current sensor 314 and low current sensor 316, as shown in FIGS. 3 and 5, may be augmented and/or replaced by the single current sensing module 602. The single current sensing module 602 may desirably be positioned to sense the current across the coil 122 of the buck driver module 104 (see FIG. 3) by being positioned, for example, at the junction formed by leads extending from and coupling to each of the other the hi switch 304, low switch 306, and coil 122. It is to be appreciated that the coil current is essentially the LED current $I_{LED}$ flowing through the driver module 300. It is to be appreciated that for any embodiment the location of the single current sensing module 602 relative to the driver module 304 may vary provided, however, that the current provided to the LED units 108a-n during both the "on" and "off" states of any given cycle may be sensed. Further, per at least one embodiment, the single current sensing module 602 may be coupled to the low comparator module 524 (FIG. 5), to output thereto the $I_{SENSE3}$ current signal via lead 604. It is to be appreciated that the $I_{SENSE3}$ single sensed current signal equals $I_{LED}$ during all states and cycles of operation for the driver circuit 304.

As further shown in FIG. 6 and with respect to at least one embodiment of the present disclosure, the hi comparator module 534 (FIG. 5) and low comparator module 524 (FIG. 5) may be replaced by a joint comparator module 601 which may be configured to operate with respect to two or more thresholds, such as the $t_{ON}$ and $t_{OFF}$ thresholds. Additionally, both the $I_{MAX}$ and $I_{MIN}$ current signals may be communicated by the first summing module 508 and the second summing module 514 to a multiplexer 606. The multiplexer 606 may be configured to communicate the corresponding $I_{MIN}$ or $I_{MAX}$ signal, as depending on the current state ("on" or "off") then being sensed by the single current sensing module 602, to the joint comparator module 602.

As further shown in FIG. 6 with respect to at least one embodiment of the present disclosure, the multiplexer 606 may be coupled to the joint comparator module 601 via lead 608 and the joint comparator module 601 may be configured to output the set signal S to multiplexer 606 via lead 610. The multiplexer 606 may be configured to toggle between the signals being provided on lead 512 and lead 516 based on the then corresponding state, "on" or "off" as represented by the set signal, of the driver module 300 for that given cycle n.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A power supply comprising:
  a buck converter module operably connected to a power source and a load;
  a first switch configured to operably couple the power source to the buck converter module during a first period of a given operating cycle;
    wherein during the first period the buck converter module stores and provides electrical power from the power source to the load;
    wherein the electrical power provides a current and a voltage to the load;
  a second switch configured to, during a second period of the given operating cycle, operably discharge to the load the electrical power stored in the buck converter module during the first period; and
  a first current sensor configured to sense the current during at least one of the first period and the second period;
  wherein, over the operating cycle, the current is maintained at an average current by an adjustment of at least one of a maximum and a minimum of the current provided to the load during the given operating cycle.

2. The power supply of claim 1, wherein operating states for the first switch and the second switch are substantially diametrically opposed.

3. The power supply of claim 1,
  wherein adjustments to the first period adjust the maximum of the current provided to the load during the given operating cycle; and
  wherein adjustments to the second period adjust the minimum of the current provided to the load during the given operating cycle.

4. The power supply of claim 3,
  wherein the first period is adjusted based upon a comparison of a desired maximum current and a present value of the current provided to the load during the given operating cycle;
  wherein the second period is adjusted based upon a comparison of a desired minimum current and a present value of the current provided to the load during the given operating cycle.

5. The power supply of claim 4, wherein the first current sensor is configured to sense the current during each of the first period and the second period at a junction electrically coupling each of the first switch, the second switch and the buck converter module.

6. The power supply of claim 4, comprising:
  a second current sensor configured to sense the current during the second period;
    wherein the first current sensor is configured to sense the current during the first period.

7. The power supply of claim 4, comprising:
  a regulating module, operably coupled to the first switch, the second switch and the first current sensor, and configured to:
    instruct the first switch to open and the second switch to close when the current equals a desired maximum current during the given operating cycle; and
    instruct the first switch to close and the second switch to open when the current equals a desired minimum current during the given operating cycle;
  wherein upon closure of the first switch and opening of the second switch a next operating cycle begins.

8. The apparatus of claim 7, wherein the average current is a target current for the load for the given operating cycle.

9. An apparatus for regulating the operation of a power supply module, comprising:
  a first comparator, coupled to a low current sensor, configured to detect when a minimum current provided by a power supply module to a load reaches a target minimum current and, when such detection occurs, output a set signal; and
  a second comparator, coupled to a high current sensor, configured to detect when a maximum current provided by the power supply module to the load reaches a target maximum current, and when such detection occurs, output a reset signal;
  a driver control module, coupled to the first comparator, the second comparator, a high switch, and a low switch, and configured to control operating states of each of the low switch and the high switch in response to receipt of the set signal and the reset signal;
    whereupon receipt of the reset signal, the low switch is closed, the high switch is opened, and the power supply module enters a second period of a current operating cycle having a first period followed by the second period, wherein electrical power stored in the power supply module is discharged to the load at an output current and an output voltage; and
    whereupon receipt of the reset signal, the low switch is opened, the high switch is closed, and the power supply module enters the first period of the current operating cycle, wherein electrical power provided by a power source is stored in the power supply module and provided by the power supply module to the load as the output current and the output voltage.

10. The apparatus of claim 9, wherein the output current is regulated to a desired target current over the operating cycle by adjusting at least one of the target maximum current and the target minimum current.

11. The apparatus of claim 10, comprising:
a period compare module, coupled to at least one of the first comparator and the second comparator, configured to:
measure for the current operating cycle at least one of a minimum time and a maximum time;
wherein the minimum time arises during the second period and is the amount of time needed for the output current to decrease from a maximum current to the target minimum current; and
wherein the maximum time arises during the first period and is the amount of time needed for the output current to increase from a minimum current to the target maximum current;
compare the minimum time measurement for the current operating cycle with a previous minimum time measurement for a previous operating cycle; and
output a result of the comparison.

12. The apparatus of claim 11, comprising:
an adjustment module, coupled to receive the output of the period compare module, and configured to:
receive the output of the period compare module;
determine a switching frequency of the driver module;
compare the switching frequency of the current operating cycle to a target switching frequency; and
output based on a result of such comparison a current adjustment signal.

13. The apparatus of claim 12, wherein the current adjustment signal is utilized to adjust at least one of the target minimum current provided to the first comparator and the target maximum current provided to the second comparator.

14. The apparatus of claim 13, wherein the current adjustment signal indicates an amount of change desired in the current to be provided to the load during the next cycle.

15. The apparatus of claim 14, wherein the power supply module comprises a buck converter.

16. The apparatus of claim 11, comprising an adjustment module configured to symmetrically adjust the target maximum current and the target minimum current based upon the output from the period compare module for the current operating cycle for use with an immediately subsequent operating cycle.

17. A method for regulating a power supply, comprising:
adjusting an "on-time" period for a power supply module such that an output current of the power supply module does not exceed a target maximum current for the power supply module; and
adjusting an "off-time" period for the power supply module such that an output current of the power supply module does not exceed a target minimum current for the power supply module;
wherein an operating cycle for the power supply module includes the "on-time" period and the "off-time" period;
wherein the target maximum current and the target minimum current are set such that the output current of the power supply equals a target output current over the operating cycle.

18. The method of claim 17, wherein the target maximum current and the target minimum current are symmetrically disposed about an average output current equal to the target output current.

19. The method of claim 18, comprising:
wherein adjusting the "on-time" period and the "off-time" period comprises:
comparing the output current of the power supply module for the current operating cycle to each of the target maximum current and the target minimum current;
when the output current equals the target minimum current;
configuring a first switch into a first operating state;
configuring a second switch into a second operating state;
providing the target maximum current for use in the comparing operation;
when the output current equals the target maximum current;
configuring the first switch into the second operating state;
configuring the second switch into the first operating state; and
providing the target minimum current for use in the comparing operation.

20. The method of claim 19, comprising:
receiving the target output current;
during the "on-time" period, determining the target maximum current by adding an adjustment signal to the target output current;
during the "off-time" period, determining the target minimum current by subtracting the adjustment signal from the target output current;
wherein the adjustment signal represents a change in the target maximum current or target minimum current desired for the output current for the next operating cycle to equal the target output current;
wherein the adjustment signal represents an inverse of the respective difference arising between a first duration for a previous operating cycle and second duration utilized for the current operating cycle; and
wherein during the first duration and second durations are determined for each "on-time" period and each "off-time" period.

* * * * *